No. 677,597. Patented July 2, 1901.
C. U. RHOADES.
DEVICE ADAPTED FOR OPERATING KETTLE LIDS.
(Application filed June 6, 1898. Renewed Mar. 16, 1901.)
(No Model.)

Witnesses
L. C. Hills.
W. A. Roberts.

Inventor:
Curtis U. Rhoades,
By Glanochdeo
Attorneys

UNITED STATES PATENT OFFICE.

CURTIS U. RHOADES, OF POOLVILLE, NEW YORK.

DEVICE ADAPTED FOR OPERATING KETTLE-LIDS.

SPECIFICATION forming part of Letters Patent No. 677,597, dated July 2, 1901.

Application filed June 6, 1898. Renewed March 16, 1901. Serial No. 51,555. (No model.)

*To all whom it may concern:*

Be it known that I, CURTIS U. RHOADES, a citizen of the United States, residing at Poolville, in the county of Madison and State of New York, have invented certain new and useful Improvements in Devices Adapted to Operate Kettle-Lids; and I do hereby declare the following to be a full, clear, and exact description of the invention, such as will enable others skilled in the art to which it appertains to make and use the same.

My invention has relation to devices adapted to operate kettle-lids; and it consists in the novel construction and arrangement of its parts, as hereinafter described.

One object of the invention is to provide a simple and cheap mechanism adapted to be connected to the bail of the handle of the kettle in such manner as not to interfere with the grip of the handle (the said mechanism being connected to the kettle-lid) as the bail of the handle is swung up in an upright position.

A further object of the invention is to provide a simple and effective means whereby the connection between the bail and the kettle-lid may be easily and readily detached from the kettle-lid, if at times it may be desirable to swing the bail to one side without operating the lid. This is especially desirable when the kettle is packed for shipping.

Figure 1:
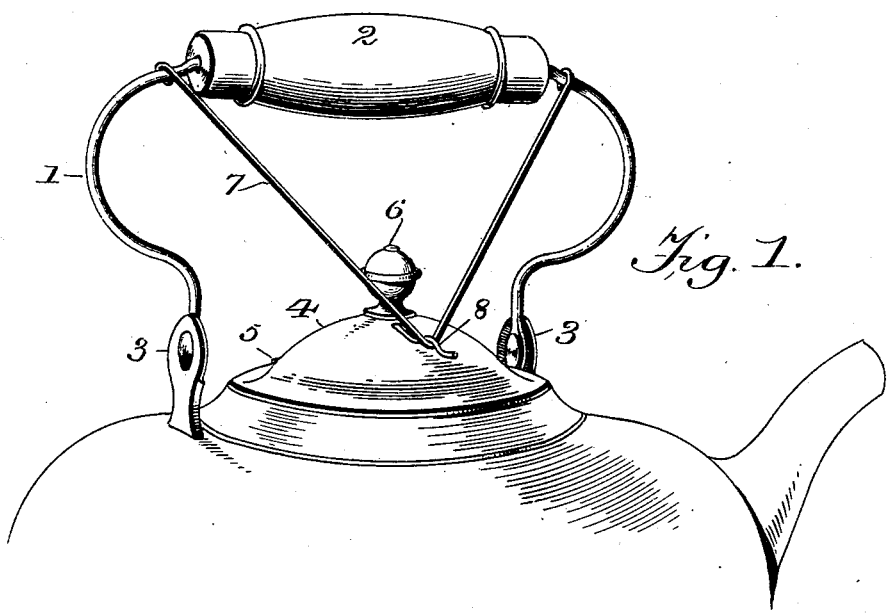
Figure 2:
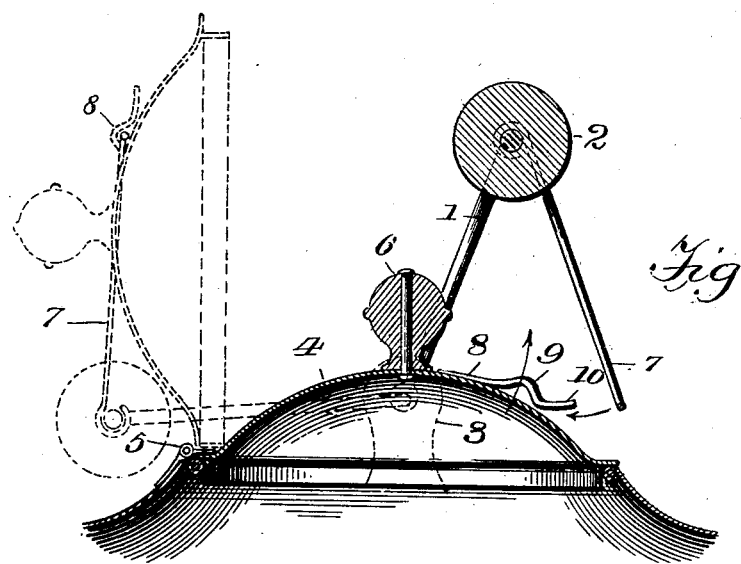

In the accompanying drawings, Figure 1 is a perspective view of the upper portion of the kettle, showing the device; and Fig. 2 is a sectional view of the upper portion of the kettle, the heavy lines showing the position of the parts when the kettle-lid is down, the dotted lines showing the position of the parts when the kettle-lid is swung up, the heavy lines also showing the connection disengaged from the lid.

The kettle is provided with the ordinary bail-handle 1, having at its intermediate portion the grip 2, the said handle being pivoted at its ends to suitable lugs 3, attached to the body of the kettle. The lid 4 is connected by means of the hinge 5 to the body of the kettle, the said lid being provided with the ordinary knob 6. The substantially V-shaped wire 7 extends at its ends around the bail 1 at the opposite ends of the grip 2. The apex of the V, constituting the shape of the wire 7, is adapted to pass under the catch 8, said catch being attached to the top of the lid 4. The catch 8 consists of a wire, which is fixed at its upper end to the top of the kettle-lid, said wire having at an intermediate portion the upward bow 9, forming a recess between its under side and the top of the lid, and the outwardly-extending end 10, formed at the downwardly-extending portion of the bow 9. The catch 8 has sufficient elasticity to permit the apex of the V-wire 7 to pass under the lower end of the bowed section 9. In engaging the rod 7 with the catch the end 10 passes between the opposite sides of the wire, the said end 10 serving as a guide in conjunction with the top of the kettle and leads the lower portion of the wire 7 under the bowed section 9. To disengage the rod 7, it may be forced out by moving the bail 1 toward the catch 8, as indicated in Fig. 2. When the rod 7 is engaged with the catch 8, a pivotal connection is made between the upper ends of the rod 7 and the bail 1 and between the intermediate portion of the said rod and the catch 8. When it is desired to elevate the lid 4 to refill the kettle, the bail 1 is simply swung to one side, as shown in dotted lines in Fig. 2, and the rod 7 will lift the lid, the knob 6 passing between the ends, as shown, and thus the kettle is opened without danger of burning the hands from the steam. The kettle can then be refilled and the bail 1 turned in its upright position, and the lid is closed.

The mechanism for operating the lid does not in any manner interfere with the grip 2 of the bail 1, and the kettle may be readily removed from the stove with the lid closed without danger of jolting the lid off, and thus scalding the hand.

Having thus described my invention, what I claim as new, and desire to secure by Letters Patent, is—

In combination with a kettle having a pivoted bail and a hinged lid, a substantially V-shaped rod pivotally connected at its ends to the bail on opposite sides of the grip thereof, a catch consisting of a spring-wire fixed at one end to the lid, said wire having at an intermediate portion an upward-bowed section and at the lower end of said bowed section an outwardly-extending end, the intermediate portion of the V-shaped rod adapted to pass under the catch and be retained in the upward-bowed section of the same.

In testimony whereof I affix my signature in presence of two witnesses.

CURTIS U. RHOADES.

Witnesses:
GEO. E. NASH,
FRED B. TUTTLE.